(12) United States Patent
Owen et al.

(10) Patent No.: US 9,738,825 B2
(45) Date of Patent: *Aug. 22, 2017

(54) PHOTOCHROMIC INKS

(71) Applicant: Chromatic Technologies, Inc., Colorado Springs, CO (US)

(72) Inventors: Timothy J. Owen, Colorado Springs, CO (US); Eric Cathie, Colorado Springs, CO (US); Kristin A. Fletcher, Colorado Springs, CO (US)

(73) Assignee: Chromatic Technologies, Inc., Colorado Springs, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/941,306

(22) Filed: Nov. 13, 2015

(65) Prior Publication Data

US 2016/0068746 A1 Mar. 10, 2016

Related U.S. Application Data

(63) Continuation of application No. 13/663,266, filed on Oct. 29, 2012, now Pat. No. 9,187,668.

(60) Provisional application No. 61/694,157, filed on Aug. 28, 2012, provisional application No. 61/552,288, filed on Oct. 27, 2011.

(51) Int. Cl.
  *G02B 5/23* (2006.01)
  *C09K 9/02* (2006.01)
  *C09D 11/50* (2014.01)
  *C09K 9/00* (2006.01)
  *G02F 1/00* (2006.01)
  *C09D 11/00* (2014.01)

(52) U.S. Cl.
  CPC .............. *C09K 9/02* (2013.01); *C09D 11/50* (2013.01); *C09K 2211/1088* (2013.01)

(58) Field of Classification Search
  CPC ................. C09K 9/02; C09K 2211/1088
  USPC ................ 106/31.13, 31.33, 31.65; 252/586; 427/401; 523/400
  See application file for complete search history.

(56) References Cited

U.S. PATENT DOCUMENTS

| 4,150,997 A | 4/1979 | Hayes |
| 4,170,578 A | 10/1979 | Schelhaas |
| 4,927,180 A | 5/1990 | Trundle |
| 5,017,225 A | 5/1991 | Nakanishi et al. |
| 5,256,192 A | 10/1993 | Liu et al. |
| 5,445,671 A | 8/1995 | Herget et al. |
| 5,460,646 A | 10/1995 | Lazzouni et al. |
| 5,591,255 A | 1/1997 | Small |
| 5,623,003 A | 4/1997 | Tanaka |
| 5,630,869 A | 5/1997 | Amon et al. |
| 5,633,308 A | 5/1997 | Gor |
| 5,639,514 A | 6/1997 | Jones et al. |
| 5,684,069 A | 11/1997 | Auslander et al. |
| 6,706,460 B1 | 3/2004 | Williams et al. |
| 6,770,687 B1 | 8/2004 | Tan et al. |
| 6,818,699 B2 | 11/2004 | Kajimaru et al. |
| 7,141,105 B2 | 11/2006 | Udagawa et al. |
| 7,351,362 B2 | 4/2008 | Yasuda et al. |
| 2005/0179253 A1 | 8/2005 | Rivera et al. |
| 2007/0003776 A1* | 1/2007 | Kang ............ G03C 1/74 428/522 |
| 2009/0097898 A1 | 4/2009 | Iftime et al. |
| 2009/0289236 A1 | 11/2009 | Destro et al. |
| 2011/0082035 A1 | 4/2011 | Morimitsu et al. |

FOREIGN PATENT DOCUMENTS

| EP | 0025075 | 3/1981 | |
| EP | 0816116 | 1/1998 | |
| GB | 1488950 | 10/1977 | |
| JP | 2008-120862 | * 5/2008 | ............ C09K 9/02 |
| KR | 1020080050503 | 6/2008 | |
| WO | WO 99/24527 | 5/1999 | |
| WO | WO 2010/037660 | 8/2010 | |

OTHER PUBLICATIONS

U.S. Appl. No. 13/663,266, filed Oct. 29, 2012.
U.S. Appl. No. 61/694,157, filed Aug. 28, 2012.
U.S. Appl. No. 61/552,288, filed Oct. 27, 2011.
International Search Report and Written Opinion in related PCT International Patent Application No. PCT/US2012/062464, mailed Feb. 26, 2013, 10 pages.

* cited by examiner

*Primary Examiner* — Bijan Ahvazi
(74) *Attorney, Agent, or Firm* — Craig R. Miles; CR MILES P.C.

(57) ABSTRACT

Metal deco ink formulations are improved by the use of fluorescent dyes, UV-absorbing dyes and/or IR-absorbing dyes. These may be premixed with a phenol-formaldehyde resin without microencapsulation to protect the dye from other ink ingredients that have chemistries which are incompatible with that of the dye, in order to obtain photochromic ink formulation with a good shelf life.

8 Claims, No Drawings

PHOTOCHROMIC INKS

RELATED APPLICATIONS

This United States Patent Application is a continuation of U.S. patent application Ser. No. 13/663,266, filed Oct. 29, 2012, now U.S. Pat. No. 9,187,668, issued Nov. 17, 2015, which claims the benefit of U.S. Provisional Patent Application No. 61/694,157, filed Aug. 28, 2012, and U.S. Provisional Patent Application No. 61/552,288, filed Oct. 27, 2011, each hereby incorporated by reference herein.

BACKGROUND

Photochromic and thermochromic ink formulations are known in the patent literature, primarily for screen printing applications but also for security inks. By way of example, U.S. Pat. No. 5,591,255 issued to Small et al. describes thermochromic ink formulations and their methods of use. U.S. Pat. No. 5,017,225, issued to Nakanishi et al. describes microencapsulated photochromic material, together with a process for its preparation in a water-base ink composition. U.S. Pat. No. 4,927,180, issued to Trundle et al describes marking of articles with photochromic compounds. U.S. Pat. No. 5,630,869 issued to Amon et al describes reversibly photochromic printing inks. U.S. Pat. No. 7,351,362 issued to Yasuda et al. describes various photochromic materials. Photochromic ink formulations for metal decorating applications are conspicuously missing from the patent literature.

Fluorescent ink formulations are also known in the patent literature. These most often pertain to ink jet inks, but fluorescent inks are also used for security applications. Fluorescent metal decorating offset inks are conspicuously missing from the patent literature. By way of example, U.S. Pat. No. 4,150,997, issued to Hayes describes a water base fluorescent ink for ink jet printing, U.S. Pat. No. 5,256,192, issued to Liu et al. describes a solvent based fluorescent ink composition for ink jet printing. U.S. Pat. No. 7,141,105 issued to Udagawa et al. describes a water-based fluorescent ink, a recorded image using the ink, and a judging method. U.S. Pat. No. 5,445,671, issued to Herget et al. describes an offset printing ink.

Near infrared absorbing dyes have been incorporated into inks and used to enhance document security. Many of these formulations rely on detecting the near infrared fluorescence emission of dyes rather than monitoring NIR absorbance intensity. For example, U.S. Pat. No. 5,684,069, issued to Auslander describes a composition for invisible ink that is responsive to infrared light. U.S. Pat. No. 5,460,646, issued to Lazzouni et al. describes an infrared printing ink. U.S. Pat. No. 6,706,460 B1 describes stable IR dye compositions for invisible marking.

SUMMARY

The present disclosure advances the art and overcomes the problems outlined above by providing interactive photochromic inks including metal decorating ink as well as other ink types.

In one aspect, the inks may visibly change from colorless to colored upon exposure to sunlight or "black light" (i.e., UV light), and return to a colorless for state upon removal of the light source.

In one aspect, the inks may absorb IR radiation for use in security inks, invisible marking, and invisible variable data.

A metal decorative ink formulation that contains a pigment may be improved according to the instrumentalities described herein by substituting all or a portion of the pigment with a photochromic dye, such as fluorescent dyes, UV-adsorbing dyes, IR-absorbing dyes, and combinations thereof. The pigment is prepared by premixing the pigment with a phenol-formaldehyde resin, then adding a polyester resin and finally a crosslinker. This step of premixing protects the dye from other components of the ink that may have incompatible chemistries that degrade the dye. The shelf life of a composition prepared in this manner may be many weeks or months before the cross linker is added.

In one aspect, an ink composition as described herein may be used as a metal deco ink and applied to metal coils, such as are used to make beverage cans.

DETAILED DESCRIPTION

Metal deco inks are known in the art and may be purchased on commercial order from such companies as Chromatic Technologies, Inc. of Colorado Springs, Colo., as well as Tanaka Chemical Co. Ltd. of Japan, and Sun Chemical of Switzerland. Many of these inks are epoxy or polyester based, as is known in the art.

Photochromic inks may be prepared in one of two ways: (1) by blending photochromic pigment directly into a conventional ink formulation, or (2) by encapsulating photochromic pigment and milling the microcapsule into a conventional ink formulation. Where the dyes are susceptible to degradation in the epoxy or polyester formulations of metal deco inks, they may be microencapsulated to protect their functionality.

Inks developed in this way show excellent color development upon exposure to sunlight as well as direct exposure to high intensity UV light. Typical pigment concentrations range from 0.1-50% pigment by weight. Any photochromic dye, whereby color change is initiated when exposed to ultraviolet light in the range of 300-360 nm, can be incorporated into an ink formulation. Examples of applicable organic and inorganic photochromic chromophores include, but are not limited to, azobenzenes, diarylethenes, spiropyrans, spirooxazines, stilbenes, azestilbenes, nitrones, fulgides, napthopyrans, quinones, silver and zinc halides. Inks developed in this way show excellent fluorescent emission upon exposure to UV or visible light.

Fluorescent dyes include organic and inorganic dyes that are soluble in water, as well as other solvent systems. Specific examples include, without limitation, zinc or cadmium based quantum dots and nanocrystals, xanthene derivatives, cyanine derivatives, naphthalene derivatives, coumarin derivatives, oxadiazole derivatives, pyrene derivatives, oxazine derivatives, acridine derivatives, arylmethine derivatives, tetrapyrrole derivatives, as well as dyes belonging to the following trademarked families: CF dyes, BODIPY, Alexa Fluor, DyLight Fluor, Atto, FluoProbes, and MegaStokes dyes. Organic and inorganic pigments and optical brighteners capable of being dispersed in aqueous and nonaqueous systems include, but are not limited to, DayGlo, Panax, transition metal doped metal oxides and other metal complexes, Florence, and UVeda.

Near infrared (NIR) dyes are those that absorb radiation in the range of 700-2000 nm. NIR absorbing inks are prepared in one of two ways: (1) by blending a NIR absorbing dye directly into a conventional ink formulation, or (2) by encapsulating a NIR absorbing dye and blending the microcapsule into a conventional ink formulation. Inks prepared in this way show strong near infrared absorption detected using common instrumentation. Typical dye concentrations range from 0.001-10% dye by weight. NIR absorbing inks may be used for security or other applications where an "invisible" identifier is desired. NIR absorbing dyes may also be used in combination with a thermochromic or photochromic ink to destroy nearby encapsulated material via heat and create a void or dark area within an otherwise colored region upon color development. Select classes of NIR dyes applicable to the above invention include, but are not limited to, phthalocyanine, cyanine and squaraine dyes and their derivatives, as well as transition metal complexes.

Photochromic ink and coating compositions are known. However, several ink and coating chemistries do not lend themselves to the incorporation of photochromic compounds. Color changing effects fail in several ink and coating compositions due to chemistry incompatability, insolubilities, thermal degradations, etc. Herein is disclosed a general process for successfully incorporating photochromic compounds into ink and coating vehicle systems resulting in photochromic inks and coatings with commercial applications.

In general, one or more compatible solvent or vehicles (Part A) is provided in which the dye will dissolve at high concentration. Further the dye needs to be chemically stable and soluble after Part A is let down into a final ink or coating vehicle. UV stability is enhanced with the use of light stabilizers. By way of a non-limiting example, a metal decorating ink can be prepared which has the desired color changing properties once the ink is applied and baked on to aluminum coil stock, such as stock that is used in conventional processes of making beverage cans. The resin or resins which compose 'part A' and the ink or coating let down need to be compatible (miscible, soluble, cross-linkable, etc.) Other inks and coatings in which this process is applicable include UV offset, heat set offset inks, Novar inks, UV screens, UV flexo inks, solvent based flexo inks, epoxy coatings, UV curable coatings, and waterbased coatings. This list is non-limiting.

Useful dyes include any photochromic dyes, such as fluorescent dyes, UV-adsorbing dyes, IR-absorbing dyes, and combinations thereof. This includes, for example and without limitation, such photochromic dyes as photochromic quinines, triarylmethanes, pyrans, stilbenes, azastilbenes, nitrones, naphthopyrans, spiropyrans, spirooxazines, fulgides, diarylethenes, and azobenzene compounds. Useful resins and solvents for Part A include: benzyl alcohol, epoxys resins or other solvents or vehicles in which it has been determined that the photochromic dye can maintain its solubility whence in the final ink formulation while being chemically stable. Phenol-formaldehyde resins are preferred for use in Part A. Useful vehicles include polyester resins. Other useful additives for inks and coatings include: Tinuvins, Irganox stabilizers, HALS, and radical scavengers.

WORKING EXAMPLE

Example I

Photochromic Ink

A photochromic ink may be prepared from the following ingredients.

0.1-5 parts Photochromic dyes available on commercial order, for example, from QCR Solutions Corp of Port St. Lucie, Fla.)
30 parts novolac resins (phenol-formaldehyde resins)
50 parts polyester vehicle
1-5 parts acid catalyst
10 parts cross linker
1-10 tridecyl alcohol
0.1-5.0 light stabilizers Other rheological additives may include clay and silicas.

The photochromic dye is dissolved in a compatible resin. Methyl 9-methoxy-2,2,6-tris(4-methoxyphenyl)-2H-benzo[h]chromene-5-carboxylate is a particularly preferred photochromic dye. A particularly preferred resin is the novolac resin for Part A. Other resins in which dyes can be soluble in can include but are not limited to alpha methyl styrenes, epoxies, alkyds, maleic resins, etc., which may be used singly or as co-solvents to dissolve the dye. In the above example, to part A is added a polyester resin, the cross linker, and the acid catalyst. The resulting formulation is stirred until a homogenous ink is formed. The ink may be further modified with oils or other rheological modifiers to achieve proper tack and viscosity.

The resulting formulation is stirred until a homogenous ink is formed. The ink may be further modified with oils or other rheological modifiers to achieve proper tack and viscosity. Prints of the example above created print samples on an IGT print proofer which illustrated color activation in direct sunlight.

The foregoing description teaches by way of example and not by limitation. Those skilled in the art will appreciate that insubstantial changes may be made with respect to what is shown and described, and so the inventors hereby state their intention to rely upon the doctrine of Equivalents in protect g their full rights in the invention.

We claim:

1. A method of decorating metal, comprising:
printing a photochromic ink formulation to said metal;
wherein said photochromic ink formulation comprises:
a photochromic dye which changes from colorless to colored upon exposure to light; and
a vehicle; and
wherein said metal forms a beverage can.

2. The method of claim 1, wherein said metal comprises metal coil stock.

3. The method of claim 2, wherein said metal coil stock comprises aluminum coil stock.

4. The method of claim 1, wherein said photochromic dye is selected from the group consisting of: azobenzenes, diarylethenes, spiropyrans, spirooxazines, stilbenes, azastilbenes, nitrones, fulgides, napthopyrans, quinones, silver and zinc halides, triarylmethanes, pyrans, and nitrones.

5. The method of claim 1, wherein said light comprises ultraviolet light.

6. The method of claim 5, wherein said ultraviolet light is in a range of 300-360 nanometers.

7. The method of claim 1, wherein said vehicle is selected from the group consisting of: polyester resin and epoxy resin.

8. The method of claim 1, wherein said photochromic dye is encapsulated.

* * * * *